United States Patent [19]

Van Mil

[11] 3,737,948

[45] June 12, 1973

[54] DEVICE FOR REMOVING THE COLUMN OF CERVICAL VERTEBRAS FROM POULTRY

[75] Inventor: Martinus Petrus Gerardus Van Mil, Boxmeer, Netherlands

[73] Assignee: Stork Amsterdam N. V., Sportlaan, Amstelveen, Netherlands

[22] Filed: Aug. 10, 1971

[21] Appl. No.: 170,437

[30] Foreign Application Priority Data
Sept. 17, 1970 Netherlands............................ 13735

[52] U.S. Cl. ........................................ 17/11, 17/12
[51] Int. Cl. ............................................. A22c 21/00
[58] Field of Search ................................... 17/11, 12

[56] References Cited
UNITED STATES PATENTS

| | | |
|---|---|---|
| 3,277,514 | 11/1966 | Hooley.................................... 17/11 |
| 3,201,823 | 8/1965 | Mathews................................. 17/11 |
| 3,510,907 | 5/1970 | Rejsa et al. ............................ 17/11 |
| 3,514,809 | 6/1970 | Barbour et al.......................... 17/12 |

*Primary Examiner*—Lucie H. Laudenslager
*Attorney*—Woodhams, Blanchard & Flynn

[57] ABSTRACT

A device for removing the column of cervical vertebras from poultry, comprising a horizontal conveyor by which the birds, hanging by their legs are advanced, and under the conveyor two cooperating driven discs, which discs diverge at an acute angle $\alpha$ — measured in a plane which makes an acute angle $\beta$ with the vertical— and have each a bent-over edge, which edges only partially overlap each other in and in the proximity of the upper intersection where the edges intersect the aforementioned plane.

3 Claims, 2 Drawing Figures

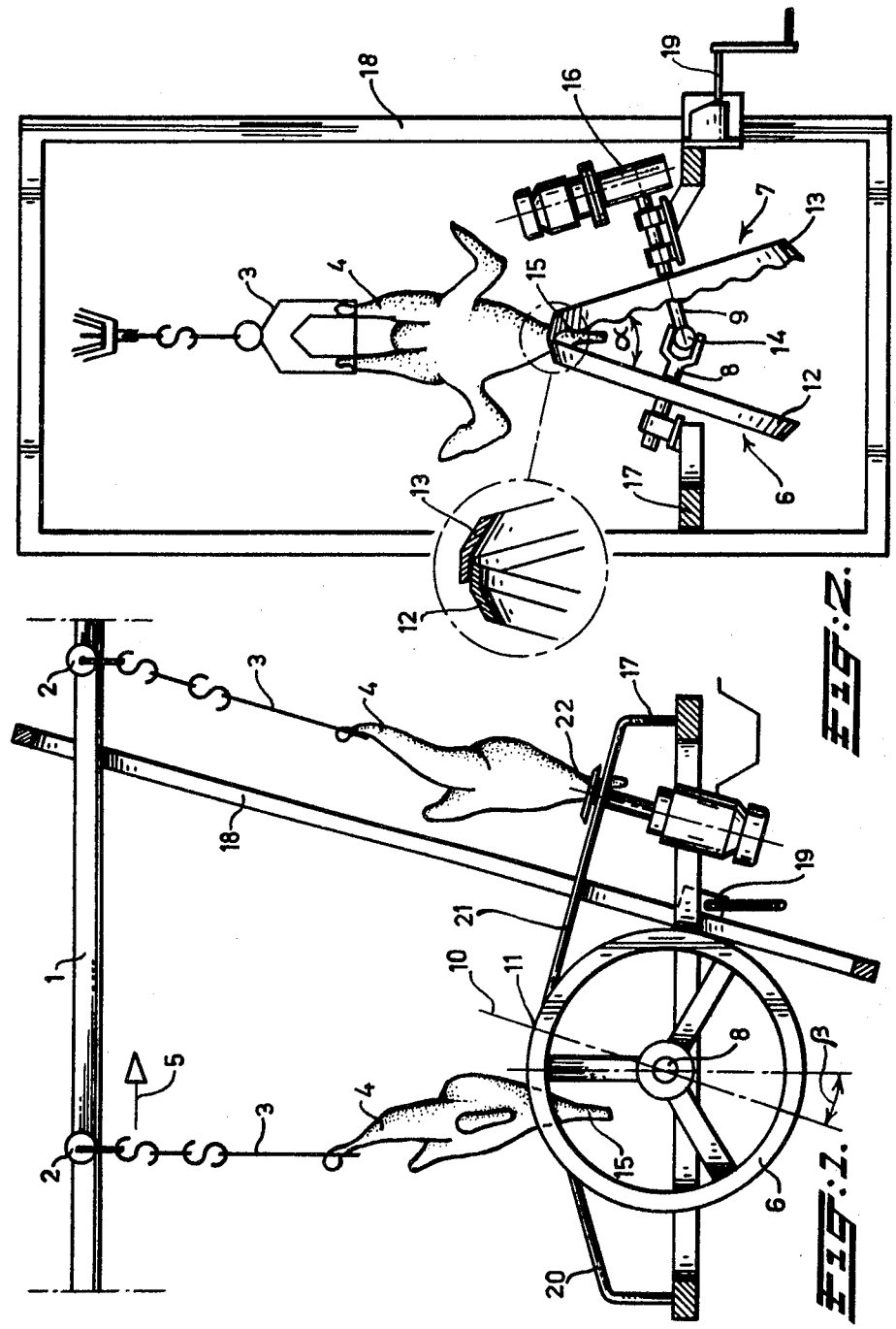

DEVICE FOR REMOVING THE COLUMN OF CERVICAL VERTEBRAS FROM POULTRY

BACKGROUND OF THE INVENTION

The invention relates to a device for removing the cervical vertebras from poultry, comprising a horizontal conveyor by which the birds hanging by their legs are advanced, and, positioned under the conveyor, two cooperating driven discs at least one of which has a non smooth edge overlapping the edge of the other disc, only partially, which discs serve to break the column of cervical vertebras, and a guide by which the birds are guided in such a way that the neck is moved in between the discs.

Such a device is known wherein the birds by their neck are fed by two endless chains to two rotatable discs arranged, with their axes vertically, above the chains. Endless chains and chain wheels cooperating therewith are, however, inconvenient when need in the moist atmosphere inherent in the treatment of slaughtered poultry which gives rise to a frequent replacement of the chains and to insanitary conditions. A further drawback of the known device is in that the necks of the birds are seized by the chains at a particular location whereupon the column of cervical vertebras is broken at a location which is always the same distance from that location. The length of the successive birds, which normally varies to a certain extent, is not taken into account.

SUMMARY OF THE INVENTION

The invention aims to obtain a device in which these drawbacks are eliminated. For that purpose according to the invention the discs diverge at an acute angle al; -measured in a plane which makes an acute angle $\beta$ with the vertical, and that the discs each have a bent-over edge, which edges only partially overlap each other in and in the proximity of the upper intersection of the edges with the aforementioned plane.

The most important effect of this feature is that it becomes possible — by adjusting the distance of the discs to the conveyor to the length of the shortest bird which normally passes — to break the column of the cervical vertebras of all birds at the same location. The function of the discs has namely become dual, namely: the breaking proper of the column of cervical vertebras, and the lifting of the longer birds, since already prior to breaking the column of cervical vertebras the trunk of the longer birds comes to bear on the outer side of the bent over edges of the discs so that, when the discs rotate further, it is lifted. As a consequence the two discs will always break the column of cervical vertebras at the same location, directly outside the trunk. The advantage of the fact that the axes are situated in a plane which makes an acute angle with the vertical is in that then the inletopening $\beta$ for the neck of the bird is rather large.

It should be noted that it is already known to break the column of cervical vertebras in poultry, without damaging the skin, by means of two discs at least one of which has a non-smooth edge. In the aforementioned known device, however, this feature is not used since the whole neck of the bird after the column of cervical vertebras has been broken is cut through. The device according to the invention has, however, preferably a member to pull the broken off column of cervical vertebras from the skin of the neck. In this way it becomes possible to remove with the device the column of cervical vertebras from poultry without damaging the skin surrounding this column.

BRIEF DESCRIPTION OF THE DRAWINGS

FIG. 1 represents in outline a side elevation of the device;

FIG. 2 represents in outline a front view - as seen in the direction of the horizontal conveyor - of the device according to FIG. 1.

DESCRIPTION OF A PREFERRED EMBODIMENT

As is represented the device comprises a conveyor shaped as a horizontal rail 1 with travelling wheels 2 from which shackles 3 are suspended in which legs 4 of the birds are fastened. The travelling wheels 2 move in the direction of the arrow 5.

The device comprises further two discs 6, 7, respectively, which make an acute angle $\alpha$ with each other and for the rest are symmetrically arranged with respect to the vertical plane; the arrangement being such that the shafts 8 and 9 are situated in a plane 10 which makes a small angle $\beta$ with the vertical. The discs 6 and 7 are closest to each other in the plane 10, namely in the highest cross sectional point 11 in this plane. As appears from FIG. 2 and from the encircled detail the bent-over edges 12 and 13 of the discs 6 and 7 overlap each other in and in the vicinity of the point 11. The edge of the disc 6 which is turned toward the universal joint 14 for the two shafts 8 and 9 is smooth. The arrangement is such that even in the area of overlap 11 of the edges 12 and 13 only the most protruding portions of the wavy edge 13 overlap the edge 12. This means that the skin of the neck 15 of a bird can still be taken up in an undamaged condition between the valleys of the wavy edge 13 and the flat edge 12, while the column of cervical vertebras is broken by the two rotating discs 6 and 7. The motor 16 rotates the two discs in the same direction.

The frame 17 for the discs and the motor is adjustable for height and secured to the frame 18. The means permitting the adjustment for height are diagrammatically represented and denoted by 19.

The two guide rods 20 ensure that the neck 15 lands at all times between the discs 6 and 7, while two guide rods 21 behind the discs 6 and 7 retain the broken off column of cervical vertebras. Since the guide rods 21 are downwardly directed in the direction of advance the column of cervical vertebras is drawn from the skin of the neck, which skin is left in an undamaged condition, when the bird moves on.

When it is desired to shorten the free length of the skin of the neck of the bird a cutting disc 22 can be arranged in the vicinity of the guide rods 21 which cuts through the skin of the neck at the desired length. The skin is supported by the guide rods 21 when it is severed. It may be advantageous to construct the guide rods in such a way that the skin is cut through when the column of cervical vertebras is still in the piece of skin to be severed. In this way an additional support on fixing the skin of the neck is obtained, so that it does not yield to the cutting knife 22. The presence of such a cutting knife is, however, not necessary.

The device operates as follows:

The birds the cervical vertebras of which sould be severed are suspended by their two legs from the shackles of the conveyor path. The shackles are hanging in such a position that the wings of the bird are perpendicular to the direction of conveyance when the bird is introduced into the device.

The wings are guided in such a way by the two foremost guide rods that they are not touched by the cutting discs. Thereupon due to the lifting action of the breaker discs the column of cervical vertebras is seized just above the breast and broken by the discs. The discs are adjusted in such a way that the skin of the neck remains undamaged. The guide rods behind the discs constitute a slit in which the skin of the neck is guided; the column of cervical vertebras is left behind these rods.

If the skin of the neck should be severed at a certain length this may be effected by means of the driven cutting disc provided to that end. By means of the member for adjusting of the cutting discs for height with respect to the conveyor the device can be adapted to the dimensions of the birds.

What I claim is:

1. A device for removing the column of cervical vertebras from poultry, comprising a horizontal conveyor by which the poultry, hanging by their legs are advanced, and under the conveyor two cooperating driven discs at least one of which has a non-smooth edge overlapping only partially the edge of the other disc, which discs serve to break the column of cervical vertebras, and a guide by which the poultry are guided in such a way that the neck is brought in between the discs, characterized in that the discs diverge at an acute angle $\alpha$ — measured in a plane which makes an acute angle $\beta$ with the vertical — and that the discs have each a bent-over edge, which edges only partially overlap each other in and in the proximity of the upper intersection where the edges intersect the aforementioned plane.

2. A device according to claim 1, characterized in that drawing means are provided for pulling loose the column of cervical vertebras from the skin of the neck.

3. A device according to claim 2, characterized in that behind the drawing means there is provided means arranged for guiding and cutting off to the correct length the skin of the neck.

* * * * *